US009523572B2

(12) United States Patent
Chen et al.

(10) Patent No.: US 9,523,572 B2
(45) Date of Patent: Dec. 20, 2016

(54) THIN-FILM CURVATURE MEASUREMENT APPARATUS AND METHOD THEREOF

(71) Applicant: INDUSTRIAL TECHNOLOGY RESEARCH INSTITUTE, Hsinchu (TW)

(72) Inventors: Tzung-Te Chen, Taipei (TW); Chien-Ping Wang, Zhubei (TW); Shang-Ping Ying, Zhubei (TW); Yi-Keng Fu, Hsinchu County (TW); Hsun-Chih Liu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 84 days.

(21) Appl. No.: 14/583,432

(22) Filed: Dec. 26, 2014

(65) Prior Publication Data

US 2016/0169666 A1 Jun. 16, 2016

(30) Foreign Application Priority Data

Dec. 12, 2014 (TW) .............................. 103143575 A

(51) Int. Cl.
*G01B 11/25* (2006.01)
*G01B 11/255* (2006.01)

(52) U.S. Cl.
CPC ......... *G01B 11/2513* (2013.01); *G01B 11/255* (2013.01)

(58) Field of Classification Search
CPC .................................................. G01B 11/2513
See application file for complete search history.

(56) References Cited

U.S. PATENT DOCUMENTS 5,011,960 A * 4/1991 Ando .................. G01R 31/308
356/237.5
5,583,632 A * 12/1996 Haga .................. G01N 21/8901
356/129

(Continued)

FOREIGN PATENT DOCUMENTS

CN 200972452 Y 11/2007
CN 102620868 A 8/2012

(Continued)

OTHER PUBLICATIONS

C. Ebert et al., MOCVD Process Modeling Using In-Situ Reflectance Test Structure Measurements for Process Control Improvement, IEEE International Conference on Indium Phosphide and Related Materials, 2005, 219-222.

(Continued)

*Primary Examiner* — Kara E Geisel
*Assistant Examiner* — Amanda Merlino
(74) *Attorney, Agent, or Firm* — Locke Lord LLP; Tim Tingkang Xia, Esq.

(57) ABSTRACT

An apparatus for measuring of a curvature of a thin film, is adapted to measure the curvature of a thin-film. The apparatus includes a light emitting module, a first optical module, a second optical module, a third optical module, an image capture module, and an image analysis module. The light emitting module emits at least one line laser as an incident light whose cross-sectional shape is a geometric picture formed of lines. The incident light is transmitted through a first optical path formed of the first optical module, and is directed to incident the thin film by the second optical module. The reflected light is reflected by the thin film go through the second optical path, and is directed to transmit through the third optical path by the third optical module, (Continued)

and then is captured by the capture module to form a second geometric picture.

22 Claims, 6 Drawing Sheets

(56) References Cited

U.S. PATENT DOCUMENTS

| | | | | |
|---|---|---|---|---|
| 5,633,718 | A * | 5/1997 | Manning | G01B 11/255 356/4.01 |
| 5,912,738 | A * | 6/1999 | Chason | G01B 11/255 356/601 |
| 6,542,249 | B1 * | 4/2003 | Kofman | G01B 11/2513 356/601 |
| 8,514,408 | B2 | 8/2013 | Zettler et al. | |
| 8,810,798 | B2 | 8/2014 | Zettler et al. | |
| 2008/0186512 | A1 | 8/2008 | Kee et al. | |
| 2010/0315422 | A1 * | 12/2010 | Andre | G06T 7/0057 345/426 |
| 2010/0324865 | A1 * | 12/2010 | Finarov | G01B 11/24 702/155 |
| 2011/0063625 | A1 | 3/2011 | Zettler et al. | |
| 2013/0021610 | A1 | 1/2013 | Zettler et al. | |

FOREIGN PATENT DOCUMENTS

| | | |
|---|---|---|
| TW | I357492 | 2/2012 |
| TW | 201221926 A | 6/2012 |
| TW | 201425863 | 7/2014 |

OTHER PUBLICATIONS

T.-B. Ng et al., In-Situ Reflectance Monitoring During MOCVD of AlGaN, Journal of Electronic Materials, Special Issue Paper, 1998, 190-195, vol. 27, No. 4.

Hyunseok Na et al., In-Situ, Real-Time Spectral Reflectance Monitoring of GaN Growth, Journal of the Korean Physical Society, 2000, 971-974, vol. 37, No. 6.

Xiaojuan Sun et al., Short-wavelength light beam in situ monitoring growth of InGaN/GaN green LEDs by MOCVD, Nanoscale Research Letters, 2012, 7:282.

B. Drévillon et al., In situ investigation of the low pressure MOCVD growth of III-v compounds using reflectance anisotropy measurements, Invited paper, SPIE, Physical Concepts of Materials for Novel Optoelectronic Device Applications I, 1990, 200-202, vol. 1361.

Intellectual Property Office, Ministry of Economic Affairs, R.O.C., "Office Action", Apr. 24, 2015, Taiwan.

* cited by examiner

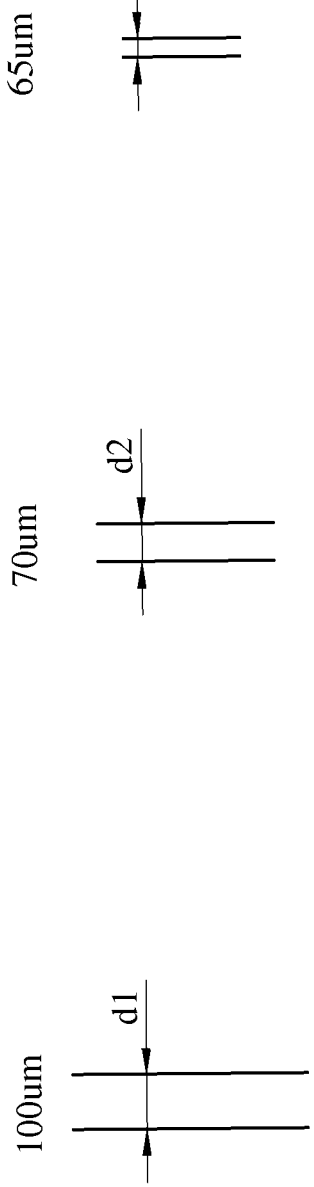
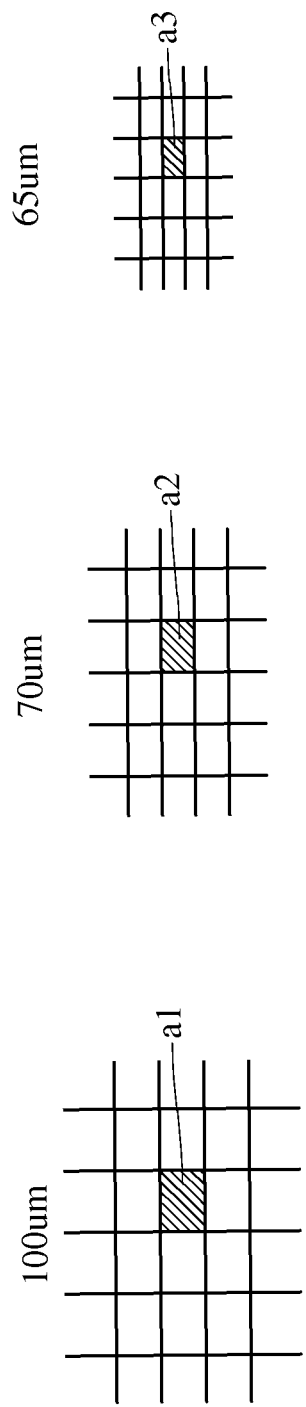

THIN-FILM CURVATURE MEASUREMENT APPARATUS AND METHOD THEREOF

CROSS-REFERENCE TO RELATED APPLICATION

This application claims the priority benefit of Taiwan application no. 103143575 filed on Dec. 12, 2014. The entirety of the above-mentioned patent application is hereby incorporated by reference herein and made a part of this specification.

TECHNICAL FIELD

This disclosure generally relates to an apparatus for measuring the curvature of a thin-film, and a measuring method thereof.

BACKGROUND

In semiconductor epitaxial deposition process, if the difference of a lattice constant is too large between the material of epitaxial substrate and the deposition substrate, for example, gallium nitride (GaN) deposits on silicon (Si) substrate. It will exist a stress between the two materials, and form a curved surface on the substrate. This phenomenon will reduce the quality of the epitaxial of the process, and cause an increased cost in manufacturing. Therefore, in the epitaxial process, the change of the curvature of the substrate needs to be monitored in real time and then understand the stresses in the layers of the structure which is most obvious immediately. The research is important to adjust the corresponding parameters to reduce the stress for all of the manufacturers.

SUMMARY

The disclosure provides an apparatus for measuring of a curvature of a thin film is provided. The apparatus includes a light emitting module, a first optical module, a second optical module, a third optical module, an image capture module, an image analysis module. The light emitting module emits at least one line laser as an incident light, the cross-sectional shape of the incident light is a first geometric picture. The first optical module provides a first optical path for the incident light transmitted. The second optical module provides a second optical path for the incident light from the first optical path to the thin film, guides a reflected light from the thin film, and the cross-sectional shape of the reflected light has at least one characteristic of a second geometric picture. The third optical module provides a third optical path for the reflected light transmitted after the second optical path. The image capture module captures the reflected light from the end of the third optical path. The image analysis module electrically connects the image capture module and determines a curvature of the thin film according to at least one characteristic of the second geometric picture; and the at least one characteristic is selected from one of a length in different axis, a distance between at least one pair of parallel lines, a circumference, and an area of the second geometric picture.

The disclosure further provides a method for measuring of a curvature of a thin film. First of all, a light emitting module emits at least one line laser as an incident light. In addition, the cross-sectional shape of the incident light is a first geometric picture. The incident light is transmitted through a first optical path, and guided from the first optical path into a thin film through a second optical path. Then, a reflected light is reflected from the thin film and guided after the second optical path into a third optical path. The cross-sectional shape of the reflected light has at least one characteristic of a second geometric picture. Then, the reflected light is transmitted in the third optical path. The reflected light is captured from the end of the third optical path. Thereafter, a curvature of the thin film is determined according to at least one characteristic of the second geometric picture; and wherein the at least one characteristic is selected from one of a length in different axis, a distance between at least one pair of parallel line, a circumference, and an area of the second geometric picture.

BRIEF DESCRIPTION OF THE DRAWINGS

The accompanying drawings constituting a part of this specification are incorporated herein to provide a further understanding of the application. Here, the drawings illustrate embodiments of the application and, together with the description, serve to explain the principles of the application.

FIG. 6A, 6B, 6C are one pair of parallel line lasers emitting a plurality of different standard data and at least one characteristic of the second geometric pictures respectively according to the disclosure.

FIG. 7A, 7B, 7C are mesh type lasers emitting a plurality of different standard data and at least one characteristic of the second geometric pictures respectively according to the disclosure.

DESCRIPTION OF EMBODIMENTS

Figure 1:
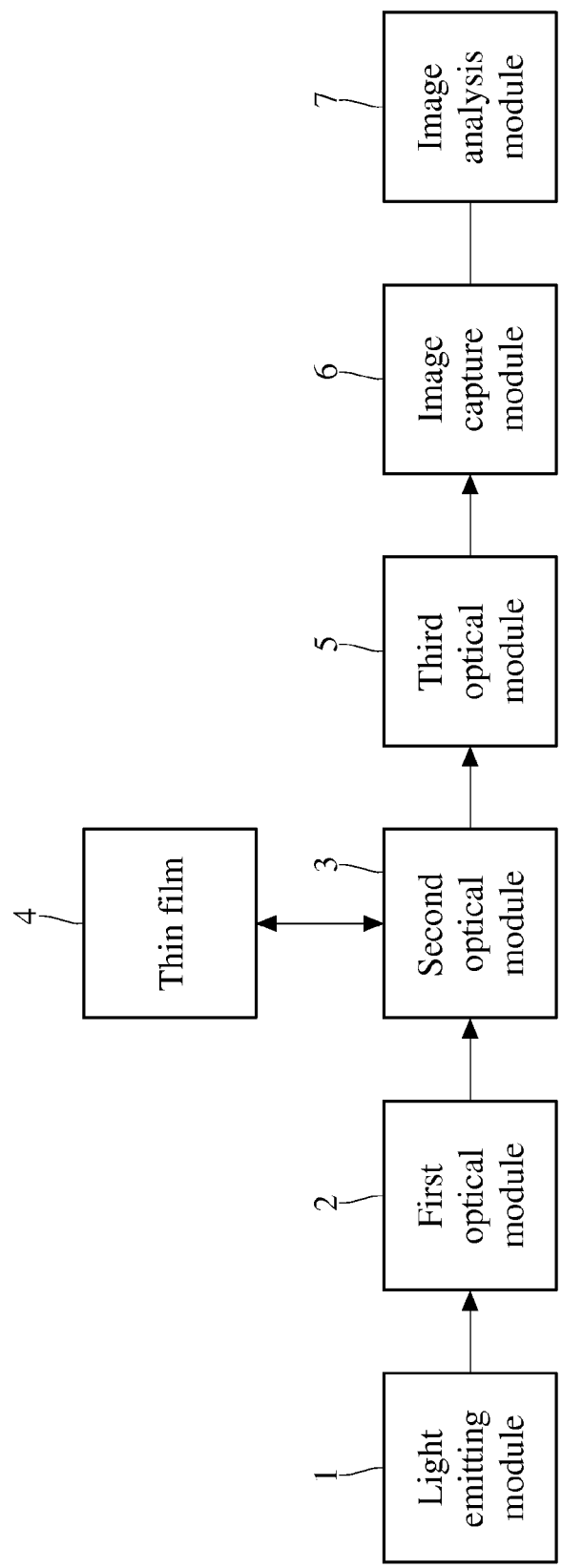
FIG. 1 is a block schematic diagram of an apparatus for measuring the curvature of the thin film according to the disclosure.

With reference to the attached drawings, the disclosure will be described by the following embodiments. Nevertheless, the disclosure may be embodied in many different forms and should not be construed as limited to the embodiments set forth herein. In the drawings, for the purpose of clarity and specificity, the sizes and region may not be illustrated in accurate proportion.

FIG. 1 is a block schematic diagram of an apparatus for measuring the curvature of the thin film according to the disclosure. As show in FIG. 1, the apparatus for measuring the curvature of the thin film is suitable for measuring a curvature of the thin film 4. Herein, the thin film 4 is a specific known curvature or tested curvature of the thin film. The apparatus for measuring the curvature of the thin film includes a light emitting module 1, a first optical module 2, a second optical module 3, a third optical module 5, an image capture module 6, and an image analysis module 7.

The image capture module 6 electrically connects the image analysis module 7. The rest of modules 1, 2, 3, 4, 5 do not connect directly with each other. The light emitting module 1 emits a light which is passed through the first optical module 2, the second optical module 3, the thin film 4, and the third optical module 5 in sequence, and simply defines their relative relationship.

In this embodiment, the light emitting module 1 of the apparatus for measuring the curvature of the thin film emits at least one line laser as an incident light. The cross-sectional shape of the incident light is a first geometric picture. The incident light is transmitted through a first optical path which is provided by the first optical module 2 and a second optical path which is provided by the second optical module 3 and then the incident light is guided in the thin film 4. Next, the thin film 4 receives the incident light and reflects a reflected light. The reflected light is guided into a third optical path which is provided by the third optical module 5 from the second optical module 3 and will be captured by the image capture module 6. The image capture module 6 captures the reflected light. Herein, the cross-sectional shape of the reflected light is a second geometric picture. The cross-sectional shape of the second geometric picture contains at least one characteristic of the second geometric picture. The image analysis module 7 determines the curvature of the thin film 4 according to the at least one characteristic of the second geometric pictures. Each module of the apparatus for measuring the curvature of the thin film will describe more detail in following description.

The light emitting module 1 emits at least one line laser as the incident light. The cross-sectional shape of the incident light is a first geometric picture. The shape of the first geometric picture may be a single straight line, a plurality of staggered linear (e.g., a cross shape, a mesh), a plurality of parallel lines or polygons (e.g., rectangular, triangular), this is not to be limited in this disclosure. In this embodiment, the at least one line laser of light emitting module 1 can be emitted by a gas laser or a solid-state laser, and the wavelength range of line laser is visible wavelength. The present disclosure is not limited thereto.

The first optical module 2 may be configured by a plurality of optical components to form a first optical path, and then the incident light is transmitted in the first optical path. The intensity or cross-sectional shape of the incident light may be adjusted by the plurality of optical components. The plurality of optical components may be a concave, a convex, or a neutral density filter (ND filter), the present disclosure is not limited thereto. The function of the second optical path is provided by the second optical module 3 is similar to the function of the first optical path, and the second optical path is for redirecting the incident light which is guided in the thin film 4 and then the reflected light is reflected from the thin film 4 along the third optical path which is provided by the third optical module 5. The third optical module 5 provides a third optical path so that the reflected light can be transmitted along the third optical path through the second optical path. The function of the third optical path is similar to the function of the first optical path. In this embodiment, the thin film 4 may be a light emitting diode (LED) wafer, but the present disclosure is not limited thereto.

The image capture module 6 captures the reflected light from the end of the third optical path, and the reflected light contains at least one characteristic of a second geometric picture. In this embodiment, the image capture module 6 may be a charge-coupled device (CCD) or a complementary metal oxide semiconductor (CMOS) camera. The present disclosure is not limited thereto.

The image analysis module 7 determines the curvature of the thin film 4 according to the at least one characteristic of the second geometric picture. In this embodiment, the image analysis module 7 may be a central processing unit (CPU) or microcontroller unit (MCU), but the present disclosure is not limited thereto. Moreover, if the thin film 4 is concave or convex and not a plane, the shape of the second geometric picture will enlarge, shrink, skew or distortion when it is compared with the shape of the first geometric picture, and the reflected light is reflected by the thin film 4.

In other words, because of the curvature of the thin film 4, the cross-sectional shape of the incident light and the reflected light may be different. If the thin films have different curvatures, then the at least one of the second geometric pictures of the reflected light will corresponding have differences. The image analysis module 7 determines the curvature of the thin film 4 according to the corresponding relationship between the at least one characteristic of the second geometric picture and the curvature. Each of the geometric pictures has a different geometric characteristic which is corresponding to the at least one characteristic of the geometric picture. For example, the at least one characteristic of the characteristic pictures may be selected from one of a length in different axis, a distance between at least one pair of parallel line lasers, a circumference, and an area of the second geometric picture.

In one embodiment, the image analysis module 7 may determine the curvature of the thin film 4 according to compare a plurality of sets of standard data and the cross-sectional shape of the reflected light which is captured by the image capture module 6. The plurality of standard data includes a predetermined experimental data in advance. One of the plurality of standard data is corresponded to a specific known curvature of the thin film 4. Furthermore, one set of standard data includes a substrate data and a characteristic data. The substrate data are a curvature of standard substrate. In one embodiment, the substrate data may indicate a specific known curvature of the thin film which is formed by a silicon substrate, or another specific known curvature of the thin film which is formed by a sapphire substrate. The characteristic data are at least one characteristic of the second geometric picture, such as the at least one characteristic of the second geometric picture is a rectangle. The characteristic data may be the length, width, or any sufficiently represent the characteristic of the rectangle. Therefore, the standard data is for indicating that a specific known curvature of standard substrate made of a specific material, the second geometric picture corresponding contains a specific characteristic.

In this embodiment, the image analysis module 7 determines the curvature of thin film according to a first characteristic data of the second geometric picture. The image analysis module 7 collects the plurality of the known standard data which include a substrate data and characteristic data and the first characteristic data and then determines the curvature of the tested thin film. The curvature of the thin film may be determined by interpolation, extrapolation or according to a corresponding algorithm between the curvature and the second geometric picture such as a regression calculation model depend on the known information. The calculation is not limited thereto the present disclosure.

The present disclosure is for that a specific cross-sectional shape of the incident light is transmitted into the thin film and reflected the reflected light. The image capture module 6 captures the reflected light which contains at least one characteristic of the second geometric picture. The image analysis module 7 determines the curvature of the thin film 4 according to at least one characteristic of the second geometric picture and a plurality of standard data. This just discloses the function of the apparatus for measuring the curvature of the thin film in the present disclosure. The embodiments of the present disclosure will describe as follows.

Figure 2:
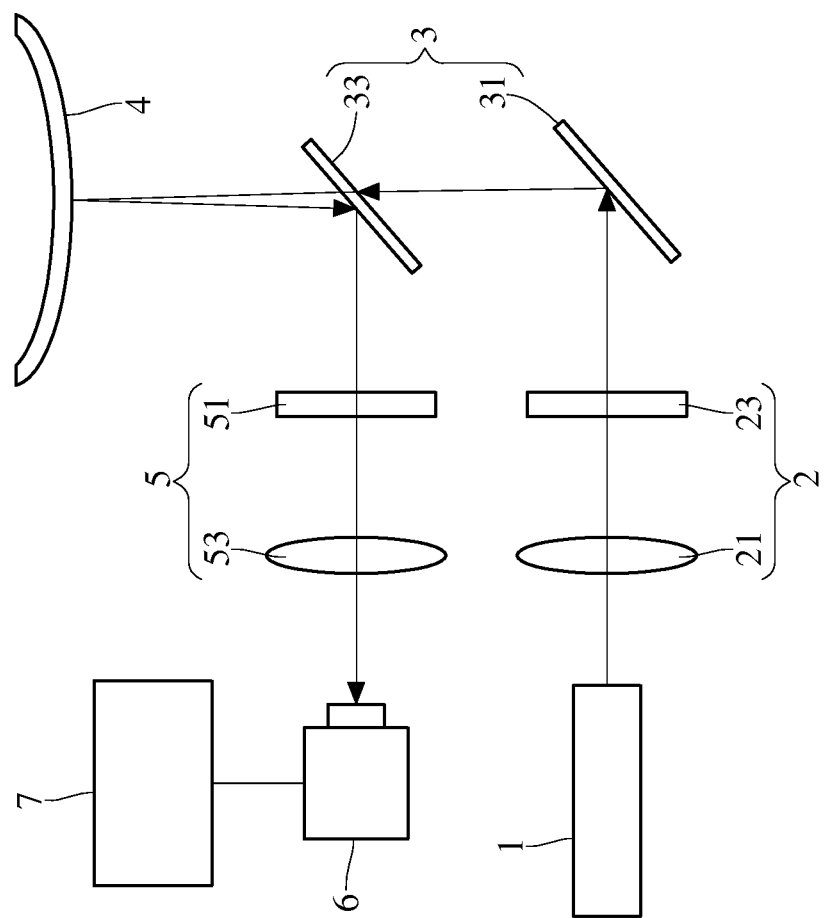
FIG. 2 is an apparatus for measuring the curvature of the thin film according to one embodiment of the disclosure.

As show in FIG. 2, FIG. 2 is an apparatus for measuring the curvature of the thin film according to one embodiment of the disclosure. In this embodiment, it shows a solid optical component which represents each of the functional blocks as show in FIG. 1. The first optical module 2 comprises a first lens 21 and a first ND filter 23, thereby forming the first optical path. The incident light is transmitted through the first lens 21 and the first ND filter 23 in the first optical path. The second optical module 3 comprises a first mirror 31 and a beam splitter 33, thereby forming the second optical path. The incident light is transmitted sequentially through the first mirror 31 and the beam splitter 33 in the second optical path. The reflected light is reflected by the thin film 4 in the second optical path and is guided into the third optical path by the beam splitter 33. Third optical module 5 comprises a second lens 53 and the second ND filter 51, thereby forming the third optical path, the reflected light is transmitted through the second lens 53 and the second ND filter 51 in the third optical path.

Therefore, the first lens 21, second lens 53 may be a convex lens, for focusing the incident light and reflected light, so as to tune a specific characteristic of the incident light or reflected light. The first lens 21, the second lens 53 may also be concave for diverging the incident light or the reflected light which has the specific characteristic. The first ND filter 23, the second ND filter 51 may be neutral attenuator for controlling the light intensity of the incident light and reflected light. Therefore, in FIG. 2, the first lens 21, the first ND filter 23 of the first optical module and the second ND filter 51, the second lens 53 of the third optical module 5 are used to tune the incident light or reflected light. The first mirror 31 is used for reflecting the incident light along a first axis and redirected the incident light into a second axis. A first surface of a beam splitter 33 is used for transmitted the incident light along the second axis, and a second surface of the beam splitter is used for reflecting the reflected light along the second axis and redirect the reflected light into the first axis. Therefore, the first mirror 31, the beam splitter 33 of the second optical module 3 are used for controlling the axis of the incident light and the reflected light and transmitted to the next angle and optical path.

Referring to FIGS. 1 and 2, in this embodiment, the light emitting module 1 emits a line laser as an incident light. The incident light pass through the first optical path of the first optical module 2 and the second optical path of the second optical module 3. The incident light and reflected light further be redirected by the second optical module 3. Furthermore, the incident light is transmitted along the first axis (e.g. X axis) in the first optical path, and redirected into the second axis (e.g. Y axis) by the second optical module 3 and then guided vertically in the thin film 4. The reflected light from the thin film 4 will be transmitted into the second optical path along the second axis, and redirected into the third optical module 5 along the first axis through the second optical module 3. As show in FIG. 2, the first axis and the second axis are orthogonal. The image capture module 6 will capture the reflected light which contains the second geometric picture from the third optical module 5. The image analysis module 7 will determine a curvature of the thin film 4 according to at least one characteristic of the second geometric picture and a plurality of standard data.

Figure 3:
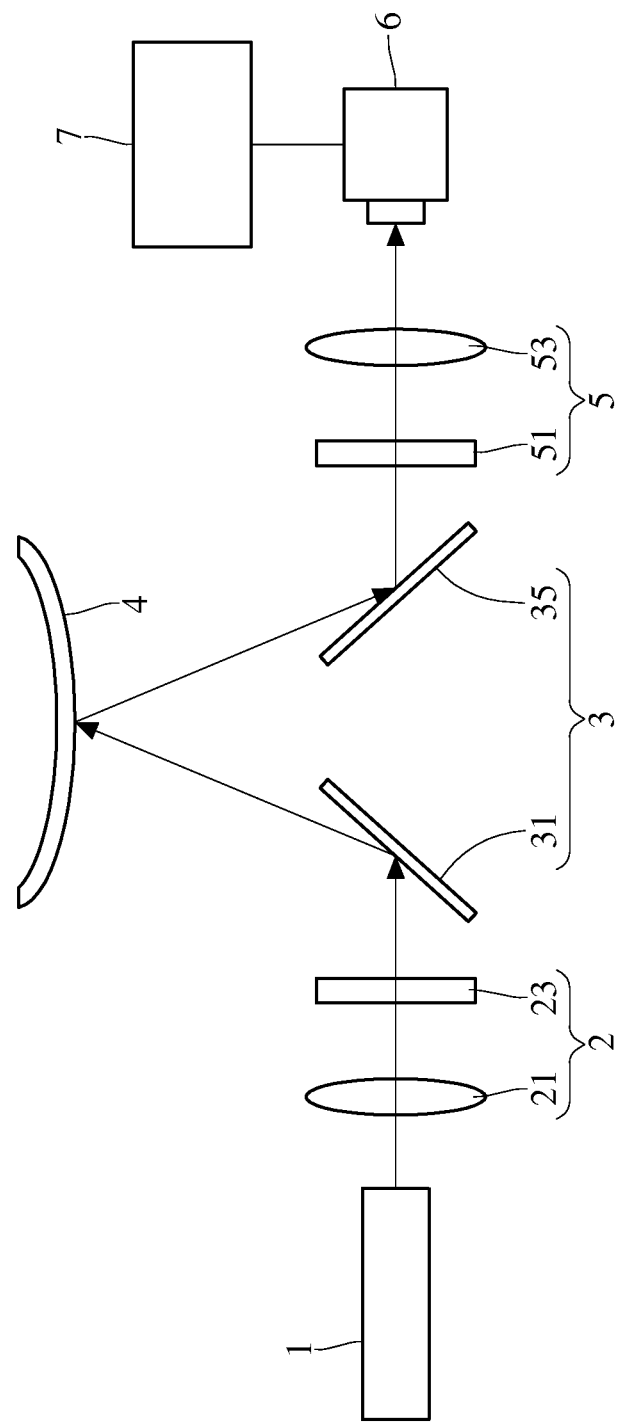
FIG. 3 is an apparatus for measuring the curvature of the thin film according to another embodiment of the disclosure.

FIG. 3 is an apparatus for measuring the curvature of the thin film according to another embodiment of the disclosure. In FIG. 3, the first optical module 2 comprises a first lens 21 and a first ND filter 23, thereby forming the first optical path. The second optical module 3 comprises a first mirror 31 and a second mirror 35, thereby forming the second optical path. The third optical module 5 comprises a second ND filter 51 and a second lens 53, thereby forming the third optical path. The incident light is transmitted along the first axis in the first optical path into the second optical path. The incident light is transmitted in the second optical path and redirected into a second axis by the first mirror 31 and then incited into the thin film 4 along the second axis. The reflected light from the thin film 4 is transmitted along a third axis. The reflected light is reflected into the third optical path along the first axis. Next, the image capture module 6 will capture the reflected light which contains the second geometric picture from the third optical module 5. The image analysis module 7 will determine a curvature of the thin film 4.

In FIGS. 2 and 3 respectively show an apparatus for measuring the curvature of the thin film according to the present embodiment. The optical module forms an optical path for the apparatus is not to be limited in above embodiment. The following embodiments will be described more detail.

Figures 4A, 4B, 4C, 5A, 5B, 5C:
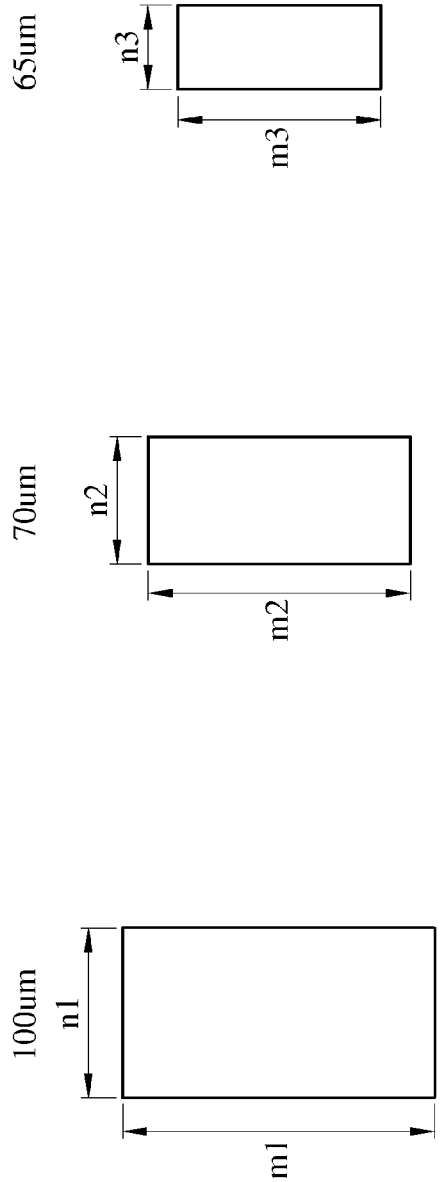
FIG. 4A, 4B, 4C are line lasers emitting a plurality of different standard data and at least one characteristic of the second geometric pictures respectively according to the disclosure.
FIG. 5A, 5B, 5C are cross lasers emitting a plurality of different standard data and at least one characteristic of the second geometric pictures respectively according to the disclosure.

FIGS. 4A, 4B, 4C are line lasers emitting a plurality of different standard data and at least one characteristic of the second geometric pictures respectively according to the disclosure. The light emitting module 1 emits a particular shape of line laser as an incident light. The incident light is transmitted and reflecting the aforementioned optical paths and three specific known curvature of different thin films. The three second geometric pictures of the reflected light are captured by the image capture module 6. In this embodiment, the second geometric pictures are corresponded to different and known suspended height of the thin films respectively in FIGS. 4A, 4B, 4C (the suspended height is 100 μm, 70 μm, 65 μm respectively). It could be understand that the different second geometric pictures will be captured from the same incident light after the thin film which has different suspended height in FIGS. 4A, 4B, 4C.

The suspended height of the thin film is measured from the highest point of the thin film to the horizontal plane. The suspended height of the thin film will correspond to its radius of curvature or curvature when the thin film has a fixed horizontal surface area. For a convex thin film, the curvature of the thin film is greater and the radius of curvature of the thin film is smaller when the suspended height is increasing. On the other side, the curvature of the thin film is smaller and the radius of curvature of the thin film is greater when the suspended height is decreasing. In this part, the present disclosure is disclosed a relationship between the at least one characteristic of the second geometric picture and the suspended height according to the suspended height, curvature, the radius of curvature.

Referring to FIGS. 4A, 4B, 4C, in the embodiment of FIGS. 4A, 4B, 4C, the light emitting module 1 emits one line laser as an incident light. The cross-sectional shape of this incident light may be a rectangle. A reflected rectangle is reflected from the incident light through a specific known suspended height of convex thin film. The length and width of the reflected rectangle will correspond reduce or enlarge, so the length and width of the reflected rectangle is also different from the rectangle of the incident light. Each of the reflected rectangles is corresponding to the curvature of different thin film 4. Therefore, the different second geometric pictures are showing in FIGS. 4A, 4B, 4C respectively.

In this embodiment, in FIGS. 4A, 4B, and 4C, for a convex thin film, the length, width of the reflected rectangle is greater when the suspended height is increasing. In this embodiment, when the suspended height of the thin film is 100 μm, the length, width of the rectangle of the second geometric picture is greater than the others which suspended height of the thin film is 70 μm or 65 μm respectively. Although, the incident light is the same line laser, but as show in FIGS. 4A, 4B, 4C, the length of three different rectangle are m1, m2, and m3 respectively and there is a relative relationship is m1>m2>m3. On the other hand, the width of three different rectangle are n1, n2, and n3 respectively and there is a relative relationship is n1>n2>n3. If the thin film is concave, the above result will be different.

The present disclosure is related an apparatus for measuring the curvature of the thin film. When the suspended height or curvature of the thin film is unknown. The image capture module 6 will capture the cross-sectional shape of the reflected light of rectangle as a second geometric picture from the unknown height of the thin film. The image analysis module 7 will compare the rectangular of the second geometric picture from the unknown height of the thin film and the rectangular of the second geometric picture from the specific known height of the thin film such as length, width. Then, the suspended height and curvature of the unknown thin film will be determined by the image analysis module 7 through an interpolation or an extrapolation method.

FIGS. 5A, 5B, 5C, are cross lasers emitting a plurality of different standard data and at least one characteristic of the second geometric pictures respectively according to the disclosure. Referring to FIGS. 5A, 5B, 5C, in this embodiment, the light emitting module 1 emits two line lasers as the incident light, and the two lines form a cross-interleaved shape. So the cross-sectional shape of the incident light may be a cross-interleaved shape. The image capture module 6 captures the second geometric picture which is the cross-interleaved shape from the reflected light. The image analysis module 7 will compare the cross-interleaved shape of the second geometric picture of unknown thin film and the cross-interleaved shape of the second geometric picture of known thin film such as show in FIGS. 5A, 5B, 5C. The suspended height and curvature of the unknown thin film will be determined by the change of length of line laser in different axis.

The concept of analysis of the second geometric picture are similar between the embodiment in FIGS. 5A, 5B, 5C and the embodiment in FIGS. 4A, 4B, 4C. They both determine the suspended height of the thin film 4 according to the change of length or shape of two axes of the second geometric pictures. It is noted that the curvature of the thin film is determined according to the length, width of the second geometric picture of one single line laser in the embodiments of FIGS. 4A, 4B, 4C, but the curvature of the thin film is determined according to the length change of the second geometric picture of two line lasers in the embodiments of FIGS. 5A, 5B, 5C. Herein, there is more information in the embodiments of FIGS. 5A, 5B, 5C than the embodiments of FIGS. 4A, 4B, 4C. Therefore, the curvature or suspended height of the thin film 4 is measured more accurately than in the embodiments of FIGS. 5A, 5B, 5C.

Referring to FIGS. 6A, 6B, 6C, FIG. 6A, 6B, 6C are one pair of parallel line lasers emitting a plurality of different standard data and at least one characteristic of the second geometric pictures respectively according to the disclosure. In this embodiment, the light emitting module 1 emits two parallel line lasers as the incident light, and the incident light form one pair of parallel lines. It is different from the embodiments in FIGS. 6A, 6B, 6C. The cross-sectional shape of the incident light may be one pair of parallel lines. The suspended height and curvature of the thin film will be determined according to the change of distance between the one pair of parallel lines by the image analysis module 7. Moreover, the image analysis module 7 determines the suspended heights corresponding to the distances d1, d2, d3 of parallel lines of specific known thin films. The image analysis module 7 will determine a distance of parallel lines of the second geometric picture of the thin film and make a comparison with the specific known thin film such as in FIGS. 6A, 6B, 6C. The suspended height and curvature of the thin film will be determined according to the distance of one pair of parallel lines of the second geometric picture of the thin films.

Referring to FIGS. 7A, 7B, 7C are mesh type lasers emitting a plurality of different standard data and at least one characteristic of the second geometric pictures respectively according to the disclosure. In this embodiment, the light emitting module 1 emits a plurality of line lasers as the incident light, and the plurality of line lasers cross and form one mesh. The cross-sectional shape of the incident light may be one mesh. The image capture module 6 will capture the mesh of the second geometric picture. The suspended height and curvature of the thin film will be determined according to the change of mesh area or circumference of the second geometric picture. The image analysis module 7 determines the suspended heights corresponding to the mesh areas a1, a2, a3 or circumferences of the second geometric picture of specific known thin films. The image analysis module 7 determines the mesh area of the second geometric picture of the thin film and makes a comparison with specific known thin film such as in FIGS. 7A, 7B, 7C. The suspended height and curvature of the thin film will be determined according to these mesh areas or circumferences of the second geometric picture of the thin films.

Figure 8:
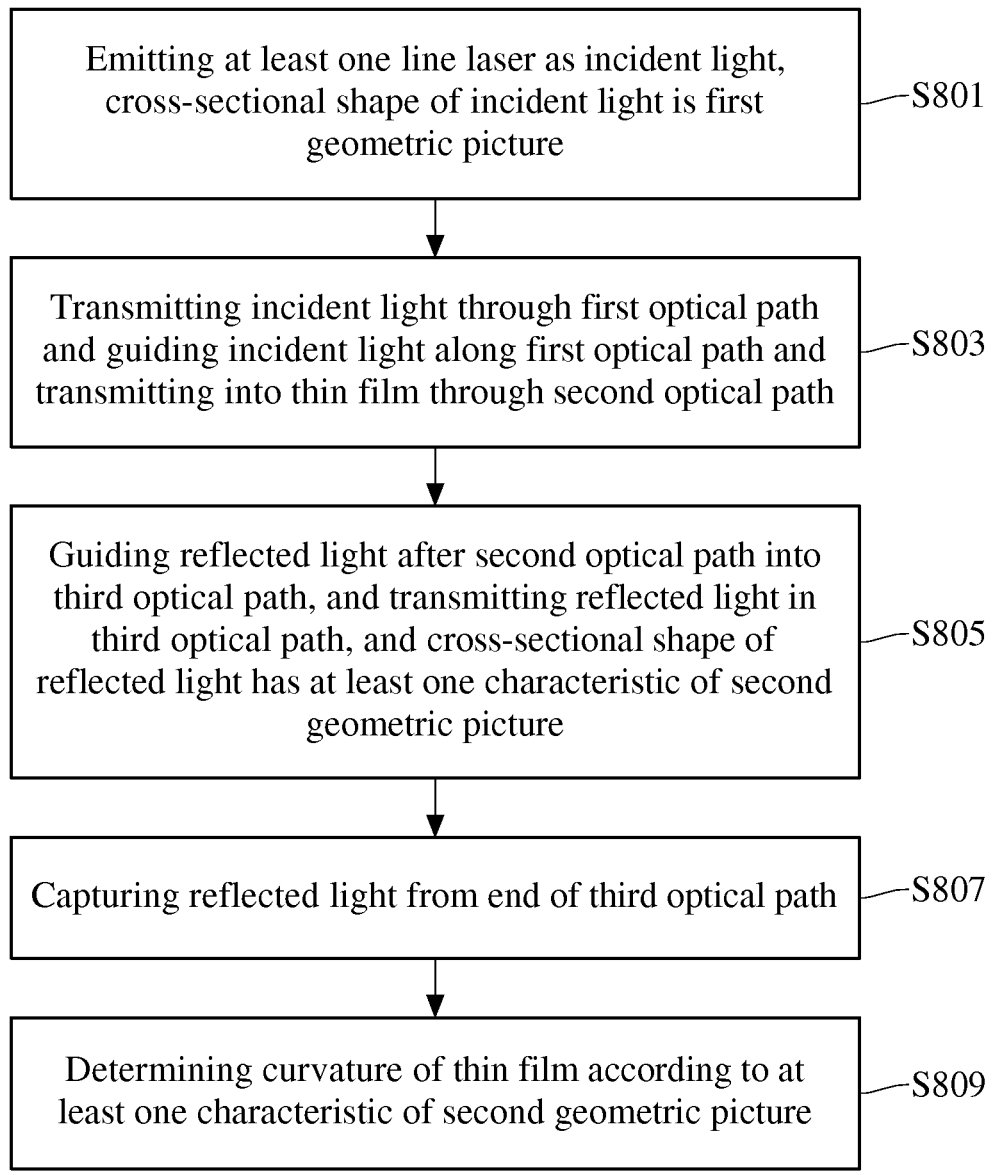
FIG. 8 is a flow chart of a method for measuring the curvature of the thin film of according to the disclosure.

The present disclosure also provides a method for measuring the curvature of the thin film. Referring to FIG. 8, Fig. is a flow chart of a method for measuring the curvature of the thin film of according to the disclosure. It is noted that a first, second, and third optical path of the method may be corresponding to the embodiments of FIGS. 1, 2, and 3. The first, second, and third optical module 2, 3, 5 forms the first, second, and third optical path. The method for measuring the curvature of the thin film is also applied to the aforementioned apparatus for measuring the curvature of the thin film, so also refers to FIGS. 1, 2, 3. In this method, in step S801, the light emitting module emits at least one line laser as the incident light. The cross-sectional shape of the incident light is geometric picture by the line laser. Referring to the embodiments of FIGS. 4-7, the second geometric picture may be one single line, a plurality of interlaced lines, a plurality of parallel lines or polygons.

In step S803, the incident light is transmitted through the first optical path and guided the incident light along a first optical path into the second optical path and then transmitted to a thin film. In step S805, a reflected light is reflected from the thin film along the second optical path and is transmitted into the third optical path and the cross-sectional shape of the reflected light contains at least one characteristic of the second geometric picture. In step S807, the reflected light in the end of the third optical path is captured by the image capture module 6. In step S809, a curvature of the thin film is determined according to at least one characteristic of the second geometric picture.

In the foregoing steps of the method for measuring the curvature of the thin film, the at least one characteristic of the second geometric picture is corresponding to the embodiments of FIGS. 4~7. The at least one characteristic of the second geometric picture is comprising the length in different axis, at least one of the distance between one pair of parallel lines, a circumference of the second geometric picture, and an area of the second geometric picture. In addition to, the suspended height and curvature of the thin film will be determined according to at least one characteristic of the second geometric picture of the thin film and a plurality of standard data of specific known thin film.

Based on the above, the disclosure provides an apparatus and method for measuring the curvature of the thin film. The light emitting module emits at least one line laser as an incident light. The incident light is transmitted through a plurality of light optical paths of light optical modules and guided the incident light into the unknown curvature of a thin film. The image capture module receives the reflected light from the thin film and form the second geometric picture. The image analysis module determines the curvature of the thin film according to the second geometric picture. Herein, the image analysis module 7 may determine the suspended height and curvature of the thin film according to compare a plurality of standard data and at least one characteristic of the second geometric picture. In this way, the apparatus and method for measuring the curvature of the thin film could be used in the epitaxy process and monitor real-time a change in the curvature of each wafer.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An apparatus for measuring of a curvature of a thin film, comprising:
    a light emitting assembly, emitting at least one line laser as an incident light, the cross-sectional shape of the incident light is a first geometric picture,
    a first optical assembly, providing a first optical path for the incident light transmitted,
    a second optical assembly, providing a second optical path for the incident light from the first optical path to the thin film, guiding a reflected light from the thin film, wherein the cross-sectional shape of the reflected light is at least one characteristic of a second geometric picture,
    a third optical assembly, providing a third optical path for the reflected light transmitted after the second optical path,
    an image sensor, capturing the reflected light from the end of the third optical path, and determining a curvature of the thin film according to the at least one characteristic of the second geometric picture; and
    wherein the at least one characteristic is selected from one of a length in different axis, a distance between at least one pair of parallel lines, a circumference, and an area of the second geometric picture.

2. The apparatus of claim 1, wherein the first optical assembly comprising a first lens and a first ND filter, the incident light is transmitted through the first lens and the first ND filter in the first optical path, and guided the incident light along a first axis into the second optical path.

3. The apparatus of claim 2, wherein the second optical assembly comprising a mirror and a beam splitter, the incident light is transmitted through the mirror and the beam splitter in the second optical path, the mirror receives the incident light in the first axis and redirects the incident light into a second axis, wherein the incident light is guided vertically in the thin film through the beam splitter and reflected the reflected light into the beam splitter along the second axis, the reflected light is redirected into the third optical path through the mirror, wherein the first axis and the second axis are orthogonal.

4. The apparatus of claim 2, wherein the second optical assembly comprising a first mirror and a second mirror, the first mirror receives the incident light in the first axis and redirects the incident light into a second axis, then the incident light is guided in the thin film and reflected the reflected light along a third axis, the second mirror receives the reflected light along the third axis and redirects the reflected light through the first axis into the third optical path, wherein the first axis and the second axis are not orthogonal and the first axis and the third axis are not orthogonal also.

5. The apparatus of claim 3, wherein the third optical assembly comprising a second lens and a second ND filter, the reflected light is transmitted through the second lens and the second ND filter in the third optical path, and the second lens and the second ND filter guide the reflected light along the first axis, such that the reflected light is captured by an image sensor.

6. The apparatus of claim 4, wherein the third optical assembly comprising a second lens and a second ND filter, the reflected light is transmitted through the second lens and the second ND filter in the third optical path, and the second lens and the second ND filter guide the reflected light along the first axis, such the reflected light is captured by an image sensor.

7. The apparatus of claim 1, wherein an image processor has a plurality of standard data, and compares at least one of the plurality of standard data and the at least one characteristic of the cross-sectional shape of the reflected light through an interpolation or an extrapolation method to determine the curvature of the thin film.

8. The apparatus of claim 7, wherein each of the plurality of the standard data comprising a substrate data and a characteristic data, the substrate data are a curvature of standard substrate, and the characteristic data are at least one characteristic of cross-sectional shape of the reflected light.

9. The apparatus of claim 8, wherein the standard substrate is a silicon substrate or a sapphire substrate.

10. The apparatus of claim 1, wherein the second geometric picture is a single straight line, a plurality of staggered lines, a plurality of parallel lines or a polygon.

11. The apparatus of claim 1, wherein the line laser is a solid-state laser or a gas laser, and a wavelength of the line laser is a visible wavelength.

12. A method for measuring of a curvature of a thin film, comprising:
    emitting at least one line laser as an incident light, the cross-sectional shape of the incident light is a first geometric picture,
    transmitting the incident light through a first optical path,
    guiding the incident light along the first optical path and transmitting into the thin film through a second optical path, guiding a reflected light after the second optical path into a third optical path, the reflected light is reflected from the thin film, and the cross-sectional shape of the reflected light has at least one characteristic of a second geometric picture, transmitting the reflected light in the third optical path, capturing the reflected light from the end of the third optical path, determining a curvature of the thin film according to at least one characteristic of the second geometric picture; and wherein the at least one characteristic is selected from one of a length in different axis, a distance between at least one pair of parallel lines, a circumference, and an area of the second geometric picture.

13. A method of claim 12, wherein the incident light is transmitted through a first lens and a first ND filter in the first optical path, and guided the incident light along a first axis into the second optical path.

14. The method of claim 13, wherein the incident light is transmitted through a mirror and a beam splitter in the second optical path, the mirror receives the incident light in the first axis and redirects the incident light into a second axis, then the incident light is guided vertically in the thin film through the beam splitter and reflected the reflected light into the beam splitter along the second axis, the reflected light is redirected into the third optical path through the mirror, wherein the first axis and the second axis are orthogonal.

15. The method of claim 13, wherein the incident light is transmitted through a first mirror and a second mirror, the first mirror receives the incident light in the first axis and redirects the incident light into the second axis, then the incident light is guided in the thin film through and reflected the reflected light along a third axis, the second mirror receives the reflected light along the third axis and redirects the reflected light through the first axis into the third optical path, wherein the first axis and the second axis are not orthogonal and the first axis and the third axis are not orthogonal also.

16. The method of claim 14, wherein the incident light is transmitted through a second lens and a second ND filter, the reflected light is transmitted through the second lens and the second ND filter in the third optical path, and the second lens and the second ND filter guide the reflected light along the first axis, such that the reflected light is captured by an image sensor.

17. The method of claim 15, wherein the third optical path comprising a second lens and a second ND filter, the reflected light is transmitted through the second lens and the second ND filter in the third optical path, and the second lens and the second ND filter guide the reflected light along the first axis, such that the reflected light is captured by an image sensor.

18. The method of claim 12, wherein an image processor has a plurality of standard data, and compares at least one of the plurality of standard data and the at least one characteristic of the cross-sectional shape of the reflected light through an interpolation or an extrapolation method to determine the curvature of the thin film.

19. The method of claim 18, wherein each of the plurality of the standard data comprising a substrate data and a characteristic data, the substrate data are a curvature of standard substrate, and the characteristic data are at least one characteristic of cross-sectional shape of the reflected light.

20. The method of claim 19, wherein the standard substrate is a silicon substrate or a sapphire substrate.

21. The method of claim 12, wherein the geometric picture is a single straight line, a plurality of staggered lines, a plurality of parallel lines or a polygon.

22. The method of claim 12, wherein the line laser is a solid-state laser or a gas laser, and a wavelength of the line laser is a visible wavelength.

* * * * *